US012741775B2

(12) United States Patent
O'Neill

(10) Patent No.: US 12,741,775 B2
(45) Date of Patent: Sep. 22, 2026

(54) METHOD FOR PACKAGING AND TRANSPORTING COMPRESSED FOAM SPONGES AT UP TO 20 TIMES HIGHER DENSITY THAN NORMAL WITHOUT LOSING SHAPE OR SIZE AFTER RETURNING THE SPONGE TO ITS ORIGINAL FORM

(71) Applicant: Michael O'Neill, Silver Creek, GA (US)

(72) Inventor: Michael O'Neill, Silver Creek, GA (US)

(73) Assignee: Michael O'Neill, Rome, GA (US)

( * ) Notice: Subject to any disclaimer, the term of this patent is extended or adjusted under 35 U.S.C. 154(b) by 0 days.

(21) Appl. No.: 18/602,803

(22) Filed: Mar. 12, 2024

(65) Prior Publication Data

US 2025/0289611 A1 Sep. 18, 2025

(51) Int. Cl.

*B65B 63/02* (2006.01)
*B65B 5/04* (2006.01)
*B65B 61/20* (2006.01)
*C08J 9/40* (2006.01)

(52) U.S. Cl.

CPC ............ *B65B 63/028* (2013.01); *B65B 5/045* (2013.01); *B65B 61/20* (2013.01); *B65B 63/022* (2013.01); *C08J 9/40* (2013.01); *C08J 2205/05* (2013.01); *C08J 2375/06* (2013.01)

(58) Field of Classification Search

CPC ..... B65B 63/02; B65B 63/022; B65B 63/028; B65B 61/20; B65B 61/22; B65B 5/045; B65B 31/024; B65B 31/048; C08J 9/40; C08J 2205/05; C08J 2375/06

See application file for complete search history.

(56) References Cited

U.S. PATENT DOCUMENTS 3,246,443 A * 4/1966 Slemmons .............. B65B 63/02 53/436
3,264,691 A * 8/1966 Whitehead .......... A61F 13/2085 28/143
3,290,858 A * 12/1966 Eberman ................ B65B 61/20 83/318
3,640,047 A * 2/1972 Brignall .................. B65B 11/52 156/286
4,240,193 A * 12/1980 Krein ..................... B68G 7/051 53/529
4,251,976 A * 2/1981 Zanni ...................... B65B 31/04 53/433
4,418,514 A * 12/1983 Spann ..................... B65B 31/00 53/436
4,534,984 A * 8/1985 Kuehne .................. B65D 33/02 426/106
4,711,067 A * 12/1987 Magni ..................... B65B 63/02 53/430

(Continued)

*Primary Examiner* — Joshua G Kotis

(57) ABSTRACT

A method for compressing and packaging open-cell foam sponges to between 5 and 10 times their original density for efficient transportation and storage without temperature regulation, allowing full recovery to original size within 5 seconds to 3 minutes. The method involves forming a foam from specified polymers, adding 0.1-15% water and/or defined plasticizers, compressing into sealed packaging, and restoring full resilience by rinsing in water between 25-50° C. or applying warm air between 30-50° C.

2 Claims, 2 Drawing Sheets

(56) References Cited

U.S. PATENT DOCUMENTS

| | | | | | |
|---|---|---|---|---|---|
| 4,983,642 | A * | 1/1991 | Nakano | C08L 83/04 | 521/154 |
| 5,032,622 | A * | 7/1991 | Herrington | C08G 18/4812 | 521/918 |
| 6,583,194 | B2 * | 6/2003 | Sendijarevic | C08G 18/4211 | 521/170 |
| 2002/0157353 | A1 * | 10/2002 | Smithson | B65B 63/02 | 53/512 |
| 2003/0183550 | A1 * | 10/2003 | DiLiberto, Jr. | B65D 85/07 | 53/436 |
| 2005/0159723 | A1 * | 7/2005 | Snell | A61F 13/84 | 604/385.01 |
| 2008/0086984 | A1 * | 4/2008 | Andria | B65B 31/048 | 53/436 |
| 2009/0136630 | A1 * | 5/2009 | Thiery | B65D 81/203 | 426/124 |
| 2009/0293431 | A1 * | 12/2009 | Andria | B65B 31/06 | 53/436 |
| 2010/0300461 | A1 * | 12/2010 | Gilder | C08J 9/28 | 128/864 |
| 2013/0289150 | A1 * | 10/2013 | Hager | C08G 18/4812 | 521/126 |
| 2015/0359357 | A1 * | 12/2015 | Feng | B65B 63/04 | 53/436 |
| 2018/0050109 | A1 * | 2/2018 | Kaplan | C08J 9/0085 | |
| 2018/0086888 | A1 * | 3/2018 | Cookson | C08G 18/4829 | |
| 2020/0407119 | A1 * | 12/2020 | Ichikawa | B65D 33/2508 | |
| 2021/0238393 | A1 * | 8/2021 | Zhang | C08J 9/0061 | |
| 2023/0060920 | A1 * | 3/2023 | Zheng | B65D 81/051 | |
| 2023/0165383 | A1 * | 6/2023 | Chirackal | A47C 27/002 | 53/438 |
| 2024/0384050 | A1 * | 11/2024 | Hermann | C08J 9/0042 | |
| 2024/0392076 | A1 * | 11/2024 | Lewczyk | C08J 3/12 | |

* cited by examiner

FIG. 1

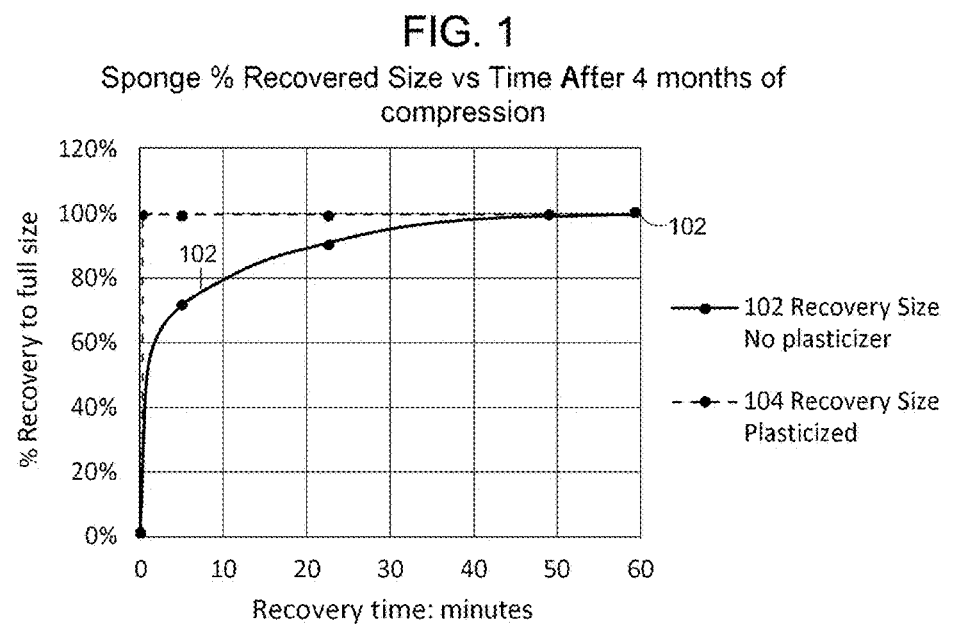

Sponge % Recovered Size vs Time After 4 months of compression

% Recovery to full size

120%
100%
80%
60%
40%
20%
0%

0 10 20 30 40 50 60

Recovery time: minutes

102

102 Recovery Size No plasticizer

104 Recovery Size Plasticized

METHOD FOR PACKAGING AND TRANSPORTING COMPRESSED FOAM SPONGES AT UP TO 20 TIMES HIGHER DENSITY THAN NORMAL WITHOUT LOSING SHAPE OR SIZE AFTER RETURNING THE SPONGE TO ITS ORIGINAL FORM

BACKGROUND a. It is well documented in the art that sponge and foam materials can be compressed and transported to save on transportation costs. U.S. Pat. No. 503,622 details a method of compressing a polyurethane foam after heating it at an elevated temperature that is above its glass transition temperature (Tg). The foam is then locked into its compressed form by reducing the temperature to below the foam's Tg. The foam is then transported in its denser form to another location where it is subjected to a temperature once again above its Tg. At the temperature above its Tg the foam expands to its original form and shape. This patent teaches that the compressed density can be from 4 to 20 times the original density and professes that during transport and in its compressed form the foam must be kept at a temperature lower than its glass transition temperature Tg. This patent highlights the constraint that the foam must be supervised under transport at a specific temperature range for the method to work. Similarly, U.S. Pat. No. 6,583,194B2 teaches of a method for compressing and transporting rigid polyurethane foams. This patent deals with foams that are rigid at ambient room temperature. The method features taking rigid foams and heating them above their Tg. While at the elevated temperature above the material's glass transition temperature Tg, the foams are compressed and formed into a new shape. While in the compressed form the temperature of the foam is lowered to below its glass transition temperature and the compressed shape of the foam is locked in its rigid state. After transport the original shape and density is recovered by increasing the temperature of the foam to above its Tg. The patent sights the useful advantage of reduced transportation costs when the foam is in the higher density state.

b. These patents and the other known art describe the use of glass transition temperature, as defined by the material properties under standard temperature and pressure, as a method to compress and hold the shape of a foam material for use in reducing transportation costs and for shape recovery. This method does not consider the effects of long-term compression and temperature excursions experienced in global transportation networks that include factory inventory time, overseas freight time, domestic warehousing and distribution and time while waiting to be sold on a retail shelf in a store. The time from first compression to recovering the original shape and form of the product for first use can be over 2 or 3 months or more. In addition, while on the journey from production to first use, the foam sponge can have experienced temperatures that range from −15° C. to well in excess of 60° C. These variations in temperature make it impractical and very costly to deploy these methods for packaging retail products for high density shipments that take more than 2 months from production to first use.

c. In addition, there is a pseudo-glass transition state related to inter-molecular space defined whereby polymers like polyurethane, cellulose, silicones and others that may contain both hard segment (crystalline segments) and amorphous chain segments sustain a reduced molecular free volume which artificially increases the glass transition temperature, the pseudo-Tg, in locations within the foam that are under compression. This effect results in less or completely non-resilient regions in the material that do not return to their full bulk volume when heated to the foam polymer's standard Tg. This problem is a major issue that prevents vacuum and compression packing of sponges and foam into retail packages since when the package is released from compression the foam sponges return to a bulk volume less than the original bulk volume. This is unacceptable to retailers since the product looks deformed and defective.

d. With certain polyurethane sponges the permanent loss of resilience is evident within 2 to 3 months after vacuum or compression packing and this deformity defect renders dense packaging of foam and sponge products undesirable.

e. The known art always requires the foam material to be treated at an elevated temperature that is above its normal glass transition temperature Tg to regain its original form and bulk density. The known art and patented methods do not address the effects of highly localized compression nor the retail requirement for the sponge foam material to be packaged for consumers and the need to be immediately available in its advertised form for use in a required situation such as household cleaning or wiping tiles in a bathroom installation or some other place of use.

f. This disclosed method shows how such retail individual or multi-unit packages of foam sponges can be used within minutes of opening the retail package for use.

SUMMARY OF INVENTION a. This invention describes a method that allows vacuum or compression packed open cell foam sponges to return to their normal size and form within minutes of being removed from their high-density packaging.

b. The method applies to foams sponges made from polyurethanes, polycaprolactone, melamine, cellulose, silicone and many other polymer materials that are made in the form of an open cell foam and have either a polymer containing amorphous and or crystalline molecular segments or exhibiting a glass transition temperature.

c. When polymers are compressed, there is a general reduction in inter molecular free volume within polymer matrix. In certain regions, caused by random non-uniformity, the free volume is exceptionally reduced further causing a significant increase in that localized polymer's glass transition temperature. This phenomenon causes a loss in resilience and when the polymer foam is released from the compressed state it does not recover to its original size and shape. To effect full recovery to the original size and form the foam must be subjected to the method disclosed herein.

d. A summary of the method is disclosed as follows.

i. Prior to formation of the foam a plasticizer such as any plasticizer known for compatibility with the polymer material used to make the foam may or may not be added to the polymer in concentration of between 0% and 10%. The mixture of polymer ingredients, including the plasticizer if added and a blowing agent is then reacted and formed into the foam and cut into product units for example: sponges. Typically, the foam is between 10 and 60 kg/m3 density but can be manufactured with a lower or higher density to suit the product end use.

ii. The foam is cut to a product requirement size and shape and prepared for packaging. Water is added to the sponge in concentrations of 0% to 15% or more by weight water to foam. The water can contain any kind of biocide that is compatible with the sponge material in sufficient quantity to prevent fungi and bacterial activity in the foam.

iii. The foam product units are then mechanically or vacuum compressed to a higher density state up to 20 times the original density. The foam is held captive in the high-density state using a packaging material to prevent any temperature changes or environmental changes from affecting the foam's compressed high-density state.

iv. The compressed foam is held in the desired high-density state during the process of transportation, warehousing, retail presentation until final use by a user. This product logistics cycle can take from days to many months. During this time the foam can be subjected to temperatures below freezing to greater than 60° C.

v. At the end of the logistics and retail sale cycle the foam is unpacked and released from it vacuum or compressed state. In general, after 2 to 3 months of compression, the unpacked foam is released from the state of compression for its intended use. Without the method described above comprising of the addition of a plasticizer and water, the foam may not return to its original size and shape. In exceptional circumstances related to the foam composition and storage conditions while under compression, the foam may still not fully recover its original size and form.

vi. To achieve full recovery from severe compaction the unpacked foam is subjected water and or heat either by rinsing in household water between 25° C. to 50° C. or by using a hot air blower at temperatures above 25° C. Full shape and form recovery will occur within 30 to 60 seconds making the foam sponge immediately available for use.

BRIEF DESCRIPTION OF THE DRAWINGS

FIG. 1 is a graph showing sponge size recovery (percentage of full size) versus recovery time (minutes) for polyurethane ester-based sponges compressed for four months. Reference numeral 102 indicates the non-plasticized sponge curve, and reference numeral 104 indicates the water-plasticized sponge curve.

Figure 2:
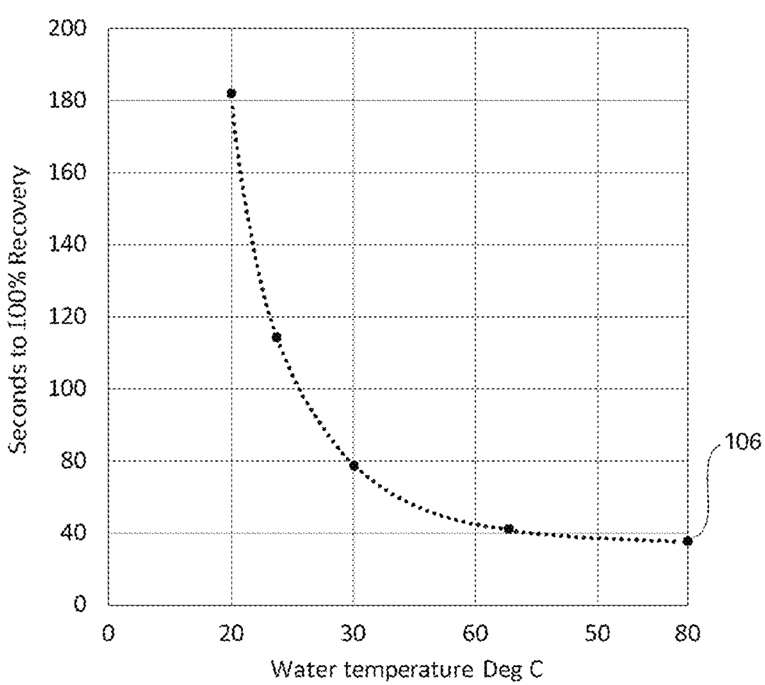
FIG. 2 is a graph showing sponge recovery time (seconds to 100% recovery) versus water temperature (° C.) for polyurethane sponges compressed to five tires their density for four years. Reference numeral 106 indicates the recovery curve.

DETAILED DESCRIPTION OF INVENTION a. The foam sponges relevant to this invention are in their rubbery state, above their glass transition temperature and experience various ambient temperature changes as expected in the natural environment. The soft rubbery foam relevant to the use of this invention is flexible and useful under normal climatic temperatures and pressures ranging from −15° C. to 40° C. and normal atmospheric pressure. They also survive logistics processes that expose them to temperature ranges from −15° C. to greater than 60° C. while containerized or stored in distribution warehouses.

b. Typically, these foam sponges are made of a polyurethane created by the reaction of ester or ether polyols or a mixture of both with various isocyanates. They can be made in various compositions and reacted with agents to modify the hard and soft polymer segments to suit the end use in terms of flexibility, hardness, tensile properties, foam cell size, density and many other properties. The sponges can be of any polymer type that exhibits a degree of hard (crystalline) and soft (amorphous) segments which allows for a change from a rigid to rubbery state depending on temperature. Other materials of use for these types of foams can be cellulose, melamine, polycaprolactone, polyester, polyether, silicone in addition to any soft polymers having polymer chains that contain polar groups or that exhibit glass transition temperatures.

c. Foam sponges of this invention when compressed under positive mechanical forces or under vacuum undergo a reduction in molecular free volume. This reduction in free volume brings both the crystalline hard segments and the soft amorphous segments of polymer chains into closer proximity allowing for increases in polar interactions such as hydrogen bonding that lead to molecular intertwining and alignment. There is an increase in a polymer's glass transition temperature (Tg) associated with this reduction in molecular free volume. Consequently, the polymer becomes less flexible and more rigid. This increase in Tg means that certain regions of the polymer foam have a higher Tg than normal and they do not recover their size and form when heated back to ambient temperature, which is typically above the polymer's normal Tg. This is a problem since when released from compression the foam permanently loses its resilience and can only recover to a fraction of its original size depending on the time, pressure and temperature it experienced while under compression. The recovered foam sponges are deemed defective since they no longer resemble their advertised original size and form. Technology disclosed in prior art is ineffective in that it does not address the real-life consequences of large variations of time under compression during the transport and warehousing processes and the effects of large ranges in temperature prior to recovery and use. Prior art also treats the foam sponge as a completely uniform material that is unaffected by real life variations in the environment. It does not deal with the fact that a retail consumer does not have the equipment nor knowledge to heat the foam passed its localized pseudo-glass transition temperature to achieve full recovery in size and form.

d. To recover 100% of the size and form of the original foam sponge, the foam must be treated to prevent the formation of inter-molecular localized regions of low free volume. A plasticizer can be used to increase the free volume while under compression and thereby prevent a permanent loss of resilience. Note that a permanent loss of resilience means that the foam sponge will not recover to its original size and shape unless treated in some fashion after it is released from the compressed state. The plasticizer can be added before foam blowing or alternatively after foam formation prior to the compression packaging of the foam. In commerce there are numerous plasticizers available for polyurethane such as Benzoflex™, Sanflex™, Ester modified polyethers, poly ether acetates, alkyl pthalates and various benzoates, laurates and citrate esters. Also, because foam sponges made from polyurethane, cellulose acetate, polycaprolactone, and melamine contain polar groups in their polymer backbone, water is a good plasticizer since it forms hydrogen bonds with various functional groups like ureas, urethane, ethers, esters and hydroxyls and thereby increase polymer chain separation. This subsequent increase in molecular free volume decreases the foam material's Tg below ambient conditions and allows the uncompressed foam to recover to its original size and shape under ambient conditions. Plasticizer concentrations of between 0% and 30% by weight are effective in supporting full recovery of the of the foam sponge within a few minutes of the release of compression. Concentration of between 0.1 and 5% by weight of plasticizer to foam sponge weight are most desired for this purpose. In the case of water the most desirable concentration is between 7% and 15% weight water to foam. It is also desirable to add an antimicrobial to the foam to prevent fungal or micro-organism activity in the material. Concentration by weight of 0.1 to 4% of an antimicrobial is effective in eliminating any fungal or micro-organism activity. The most desirable concentrations are between 0.1 and 0.3% by weight of ingredient to foam sponge weight. There are numerous commercially available antimicrobial agents available for this purpose such as MICROBAN ZP, Zinc Pyrithione, Quaternary Ammonium compounds, various metal oxides, stearates and silver to name a few. The addition of plasticizer and or water enables foam recovery to 100% of size and shape within a period of 10 second to 5 minutes even when the foam has been compressed for more than 2 or 3 months or longer with a compressed density of at least 6 times its normal density under ambient conditions.

e. In addition to adding a plasticizer or water to the foam sponges prior to compression and packaging, to guarantee a full size and shape recovery immediately after releasing the compression forces, rinsing in warm water or exposing the foam sponge to warm air will result in full recovery of size and shape. Water rinsing at temperatures between 25° C. and 70° C. is very effective resulting in a full recovery within 5 to 30 seconds. It is most desirable to use warm water between 30° C. and 50° C. since it is available as part of building code for tap water in every building and is effective for fast foam recovery taking between 20 and 30 seconds. Hot air as either a convection heater or blower is also more effective for foam recovery since temperature in the 60 to 70° C. range will affect a full recovery within 5 seconds.

f. In summary, the use of a synthetic plasticizer and or water prior to compression of the foam sponge and the subsequent application of warm water or hot air after decompression and release from its packaging will affect a full recovery of the foams size and form within a time period of 5 second to 2 minutes.

g. The invention is a method that allows vacuum or compression packed open cell foam sponges to return to their normal size and form within 5 seconds to 3 minutes of being removed from their high-density packaging. This invention is of particular use for industrial and retail sales packaging where there is an incentive to compress goods from 5 to 20 times their original density to reduce transportation, warehousing and retail shelf costs.

h. The method is as follows.

i. The material of the foam can be a polyurethane, polycaprolactone, melamine, cellulose acetate, silicone and any polar polymer containing crystalline and amorphous segments or having a Tg below room temperature.

ii. A plasticizer can be added to the polymer prior to the foaming process in the concentration of 0 to 30% by weight of the polymer. More desirable concentration is between 0 and 15%.

iii. Alternatively, water can be added to the foam prior to compression and packaging at high density. The concentration of water to foam is between 0% and 20% by weight. The most desirable concentration is in the range 0% to 13% of water to foam weight.

iv. The foam is compressed mechanically or also with the use of vacuum to a bulk density between 2 and 20 times it original density. It is most desirable to compress foams with density between 10 and 60 kg/m3 to approximately 5 times their density to reduce transportation and warehousing costs.

v. In the compressed state the foam is packaged into a container strong enough to hold the expansion forces of the sponge. The foam sponges are packed individually or as multi-packs in a single container. The container can be sealed or open to atmosphere but most desirably heat sealed in a vacuum or mechanically induced vacuum where by the compressed package is allowed to relax and expand during the sealing of the container thereby inducing a slight vacuum in the sealed package. Thus atmospheric pressure is used to supplement the compression forces applied by the sealed container. The most preferable sealed container is a single poly bag per single foam sponge unit. The poly bag can be made of any clear polymer film that is sturdy and durable enough and able to sustain a vacuum. It is preferable to be one that can be heat sealed using a commercial impulse heat sealer. One such example is a high clarity polyethylene bag with a 3 mil thickness.

vi. The packaged foam sponge complete with plasticizer and or water as required for the specific foam type is then transported over a period from a few days to 2 or more months to its final destination for use. In many cases the article may sit on a retail shelf for another 2 months waiting to be sold. In total duration the foam may remain under compression for 6 months or more. During this step the package may be containerized for ocean freight and may experience temperatures ranging from −15° C. to more than 60° C. The variation in time and temperature under compression can be excessive.

vii. At the time of use, the package is opened and the foam sponge is removed from the compressed package to be used by the end user. The foam expands to 100% of its size and form. If for unknown reasons related to excessive time, temperature and pressure the foam sponge does not fully recover the following additional steps are applied. These steps can be applied in any order or simultaneously.

1. The foam sponge can be handled, compressed massaged and pulled for 5 second to achieve full recovery. If recover is not 100% the next step is employed.
2. The foam sponge is rinsed under warm household tap water at temperatures between 25° C. and 50° C. The foam immediately expands to 100% recovery of size and shape with 5 to 30 seconds.
3. An alternative to rinsing in warm water is to blow warm air on the sponge at 30 to 50° C. The sponge will recover full size and form within 5 seconds.

EXAMPLES OF THE INVENTION a. Example 1. This example compares the rate of size and shape recovery for a polyurethane ester based polyol sponge without a plasticizer and with one.

i. A set of 5 commercial polyurethane sponge manufactured from a isocyanate/polyester polyol is compressed in a 3 mil polyethylene bag for 3 months (120 days). The polybag with compressed sponge is sealed. Overall sponge density is measured at 26 kg/m3 prior to compression. After compression the density is measured at 5 times the original density at 130 kg/m3. The sponges are held at a constant 22° C. for 120 days, then opened. The rate of recovery of size is measured versus time. Simultaneously, another set of 5 sponges are plasticized with 7% by weigh water and packaged using the same process. Their time to 100% recover was also measured. The results show that the unplasticized sponges recovered 66% in 2 minutes, 87% in 22 minutes and 99% in approximately 1 hour. The water plasticized sponge recovered 99% of its size and form within 4 minutes.

b. Example 1, FIG. 1 showing size recovery vs time for a polyurethane ester based sponge that is not plasticized with water versus one that is plasticized with water.

c. Example 2, FIG. 2. This drawing shows the rate of size and shape recovery for a test group of polyurethane foam sponges when soaked in water at 5 different temperatures. With water at 20° C., 100% sponge size is regained after 180 seconds. At 70° C. size and shape is completely regained after 2 to 4 seconds.

i. Sponges are make using an ingredient composition by weight of 20% toluene diisocynate, 45% polyether polyol, 30% polyester polyol, 4% water and the rest comprising extender amines, catalytic tin laurates and stopper.

ii. Seven sponges from this composition are tested after being compression packed for 1440 days (approximately 4 years) using the method of this invention.

iii. Sponge 1 is removed from its compression package and over a period of 5 minutes relaxes to a recovered size of approximately 50%. The sponge is monitored for 3 months and remains at approximately 50% recovery. It is exhibiting permanent loss of recovery.

iv. Sponge 2, 3, 4, 5 and 6 are removed from their compression packages in turn and subjected to a short 1 second dipping into water at specified temperatures of 70, 50, 30, 26 and 20° C. The time for the sponge to recover 100% of its size was measured against time with the flowing results (FIG. 2):

1. Sponge 2—water temperature of 70° C. 100% recovery in 2 seconds.
2. Sponge 3—water temperature of 50° C. 100% recovery in 20 seconds.
3. Sponge 4—water temperature of 30° C. 100% recovery in 30 seconds.
4. Sponge 5—water temperature of 26° C. 100% recovery in 75 seconds.
5. Sponge 6—water temperature of 20° C. 100% recovery in 3-5 minutes.

d. Example 3. This example demonstrates the impact of time under compression and the sponges subsequent permanent loss of recovery. It also demonstrated the method of using hot air to release permanent loss of resilience and regain 100% size and shape.

i. 5 sponges with a rectangular shape with original dimensions 191 mm×131 mm×47 mm (L×W×H were held at 72° C. and atmospheric pressure with no compression for 4 years. An additional 5 sponges with the same dimensions were compressed in one dimension to a density 9 times their normal density and packed into a polybag and sealed. The height H of the compressed sponges were measured to be approximately 5 mm or 11% of its original height. All 5 sponges were stored at 72 dg C. in individually sealed compression packages for 4 years. During the 4 years there was an expectation that the sponges under compression would undergo a localized change in glass transition temperature such that when released from compression at room temperature the sponges would permanently loss their resilience. The 5 sponges were unpacked from their sealed packages and allowed to recover their original shape. All 5 sponges recovered approximately 40% of their original size within 10 seconds of releasing from the vacuum compression. After recovery of the initial 40% of their original size the sponges remained unchanged for 2 months. The sponges exhibited a permanent loss of resilience. At the end of 2 months, each of the 5 sponges were heated with hot air to 50° C. and they regained full 100% recovery of their original size within 5 seconds of applying the heat. The 5 sponges that were not compressed remain dimensionally unchanged throughout the test.

e. Example 4. A set of 5 foam sponges with original dimensions 190 mm×135 mm×50 mm (L×W×H) were packed into 3 mil thick polyethylene bags and were then compressed using a mechanical device consisting of 2 metal plates of a size no more than 5 mm larger than the sponges' length and width in both directions. The top metal plate was driven by pneumatic cylinders while the bottom plate was static. When the sponges were compressed the polyethylene bags were sealed using a hot impulse line sealer. When the package consisting of the compressed sponge was removed from the compression plates it dimensions were measured to be 195 mm×136 mm×8 mm (L×W×H). The 5 sponges averaged a weight of 31.4 g and a bulk density of 24.5 Kg/m3 prior to compression. After compression the average bulk density was measured to be 148.1 kg/m3. This represents a 6-fold increase in density from the original sponges. After 3 months of storage at 72° C. and in their compressed state the sponges were released from their packaged. All sponges recovered approximately 80% of their size and form within 12 minutes. When the sponges were rinsed in hot water at 50° C. they recovered 100% of their size and form with 2 seconds.

The invention claimed is:

1. A method for making, compressing, packaging, transporting and unpackaging an open cell foam, then returning the foam to an original uncompressed size and shape, the method comprising the following steps:

making an open cell foam by reacting a mixture of polymer ingredients and a blowing agent including a plasticizer to make a foam with density between 5 and 60 kg/$m^3$;

cutting the foam into product units thereby forming a foam product;

adding water to the foam product prior to packaging, wherein the water is 30% or less by weight of water to foam weight, wherein the water includes an antimicrobial between 0.1 and 0.3% by weight of antimicrobial ingredient to foam weight;

inserting the foam product and supporting inserts into a packaging comprising a sealable plastic bag or sleeve;

compressing the foam product while inside the packaging, wherein the compressing includes compressing both the foam product and the packaging mechanically between two plates, while under vacuum, or both, wherein the compressing is carried out to achieve a foam density between 5 and 20 times the original uncompressed density of the foam product, wherein the supporting inserts are made of cardboard, paper, plastic, film, or metal to cover parts or all of the foam surfaces inside the compressed package;

sealing the foam product and the supporting inserts within the sealable plastic bag or sleeve to form a package of the compressed foam and the supporting inserts;

transporting the package;

unpackaging the foam product and releasing it from its compressed state;

subjecting the foam product to water and/or heat either by rinsing the foam in household water between 25° C. to 50° C. or by using a hot air blower at temperatures above 25° C. such that the foam product returns to the original uncompressed size and shape without losing any of its resilience, shape or form within 5 to 60 seconds.

2. The method of claim 1, wherein the polymer ingredients having both hard segment crystalline regions and soft segment amorphous regions in their structure, wherein the polymer ingredients include polyurethane, melamine-formaldehyde, polycaprolactone, cellulose acetate, or silicone that exist in the rubbery state under ambient conditions with temperatures above their glass transition temperatures, wherein the polymer ingredients are configured to be plasticized to create an artificial increase in molecular free volume to adequately ensure their existence in the rubbery state with the ambient temperature being above their glass transition state, wherein the polymer ingredients contain polar functional groups in their structure, wherein the polymer ingredients are configured to be compressed either mechanically or under vacuum, wherein the polymer ingredients are configured to lose some degree of their ability to recover full size and shape after being under compression for a period of time of more than 30 days.

* * * * *